US006585203B1

(12) United States Patent
Euker

(10) Patent No.: US 6,585,203 B1
(45) Date of Patent: Jul. 1, 2003

(54) FLAT PANEL DISPLAY EXTERIOR RACK MOUNT

(75) Inventor: Rick T. Euker, Loveland, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/617,392

(22) Filed: Jul. 17, 2000

(51) Int. Cl.7 ................................................ E04G 25/00
(52) U.S. Cl. ............... 248/200.1; 248/251; 248/222.41; 248/291.1; 248/324; 248/919; 312/223.3; 361/681
(58) Field of Search ................................. 248/918, 264, 248/919, 268, 917, 200.1, 274.1, 284.1, 286.1, 291.1, 298.1, 222.41, 324, 265, 269, 251; 348/836, 837; 312/7.2, 223.3; 361/681

(56) References Cited

U.S. PATENT DOCUMENTS

| | | | | |
|---|---|---|---|---|
| 1,377,666 A | * | 5/1921 | Byron | |
| 3,595,511 A | * | 7/1971 | Summerville, Jr. | |
| 4,226,396 A | * | 10/1980 | Bowers | |
| 5,042,766 A | * | 8/1991 | Baker | |
| 5,321,579 A | * | 6/1994 | Brown et al. | |
| 6,144,549 A | * | 11/2000 | Moss et al. | |
| 6,168,250 B1 | * | 1/2001 | Rogov | |
| 6,181,549 B1 | * | 1/2001 | Mills et al. | |

* cited by examiner

Primary Examiner—Korie Chan
(74) Attorney, Agent, or Firm—Regan L. Trumper

(57) ABSTRACT

A flat panel display rack mount is disclosed comprising a bar, two side brackets fastenable to an existing equipment rack and a hanging bracket. The side brackets are fastenable to and equipment rack using existing rack dress screws in the rack. The side brackets are fastenable at any vertical level on the rack. The bar has grooves in both ends that are capable of locking into key lug slots contained in the side brackets. The hanging bracket is formed to match the backside contours of a typical flat panel display and is affixed thereto forming a display and bracket assembly. The hanging bracket has a hook assembly for hanging on the bar. The assembly can slide onto the bar during assembly of the side brackets. The assembly slides either direction and swings upw7ard to allow access to equipment and cables contained in the equipment rack.

12 Claims, 5 Drawing Sheets

FLAT PANEL DISPLAY EXTERIOR RACK MOUNT

FIELD OF THE INVENTION

In general, the present invention relates to a method and apparatus for mounting a flat panel display in electronic equipment racks.

BACKGROUND OF THE INVENTION

Electronic equipment racks are well known for use in telecommunications, test and measurement, in electronic data processing or control, and in many other fields. Electrical/electronic equipment racks are generally comprised of a plurality of printed circuit boards or electronic components or both, mounted in a shelf unit. The plurality of the electronic components are mounted in stacked fashion one upon another and arranged in a cabinet or fitted to a frame to constitute a rack having a particular function. In electronic equipment racks, the mounting and use of electrical and electronic equipment many times requires ready accessibility of the components and wiring. Further, electronic equipment racks require displays or monitors for visual display of data and to allow user interaction with the electronic components.

The use of monitors with electronic equipment racks significantly contributes to a difficulty in accessing the components and wiring used in an equipment rack. Full size monitors are heavy and waste valuable space that is needed for other test equipment. Flat panel displays are not as bulky as full size monitors but their use inhibits access to the equipment and monitoring. Previous monitor attachment solutions have been comprised of monitor arms equipment racks, but they continue to occupy valuable space and are bulky and difficult to attach. Previous mountings utilizing a swing arm are expensive, dangerous due to weight imbalances and take up floor space unnecessarily. Previous mountings utilizing vertical slide rail are expensive and cause rack bay modifications making field replacement difficult.

FIG. 1 is a perspective view of a flat panel display 100 attached to a standard equipment rack 110. Standard equipment rack 110 includes four equipment bays 150 and a plurality of screw holes 120 along the left front side 130. Standard equipment rack 110 also includes a plurality of matching screw holes, not shown, along the right front side 140. Left front side 130 and right front side 140 are in the same plane. Flat screen display 100 is attached to standard equipment rack 110 substantially parallel to and abutting the plane of the front sides 130, 140. Note in FIG. 1 that access to the upper bay 150 is mostly blocked by the flat panel display 100. Further, flat panel display 100 is solidly affixed to standard equipment rack 110, thus not allowing it to slide or tilt.

It is apparent that a need exists for a flat panel display rack mount that provides easy access to components and wiring used in equipment racks. It is also desirable for a mounting system requiring little effort to move the display sideways or to swing the display up for easy access to complex equipment and cables and which utilizes little floor space. Further still, it is desirable for a mounting system capable of easy retrofit to fully loaded racks already in use in the field, which is easy to install, which is strong, durable and safely out of the way, and which can handle nearly any flat panel display through a standard hanging plate. Yet further desirable aspects will in part be obvious and will in part be apparent from the specification.

SUMMARY OF THE INVENTION

Generally speaking, in accordance with the invention, a flat panel display exterior equipment rack mount is provided. The rack mount assembly is affixed to an equipment rack utilizing the existing screw holes and dress screws of the equipment rack. The rack mount assembly includes a pair of support brackets having slotted key holes in one end, a hanging rod constructed to fit the slotted key holes and a hanging bracket constructed to match the backside contours of a typical flat panel display.

The pair of support brackets are constructed and sized to fit the screw holes that exist on the left and right sides of an equipment rack. The support brackets are generally identical to each other and can be interchanged right to left. One support bracket is attached to each side of an equipment rack. The two support brackets are attached at opposing screws on the left and right side of the equipment rack. At the end of each support bracket is a slotted The slotted keyhole is sized so that the hanging rod fits through the larger part thereof.

The hanging rod is comprised of a cylindrical rod with grooves cut into each end thereof. The rod fits between the two support brackets attached to the equipment rack. The grooves of the hanging rod fit into the smaller portions of the slotted keyholes in each bracket.

The hanging bracket is utilized to suspend a flat panel display from the hanging rod locked into the slotted keyholes on each support bracket. The hanging bracket is comprised of one end that is contoured to match the back side of a flat panel display and a second end that hooks the hanging rod. The hanging bracket is firmly attached to the back side of a flat panel display and suspended from the hanging rod. The hanging bracket and the attached flat panel display slide to the left or right to allow access to the equipment and cables in the equipment rack. The hanging bracket and attached flat panel display also tilt to allow access. The dimensions of the hanging bracket are such that sliding the bracket and attached flat panel display to the left or right provides access to at least half of the equipment and cables in an equipment rack.

BRIEF DESCRIPTION OF THE DRAWINGS

For a fuller understanding of the invention, reference is made to the following description taken in connection with the accompanying drawings, in which.

DETAILED DESCRIPTION

Figure 1:
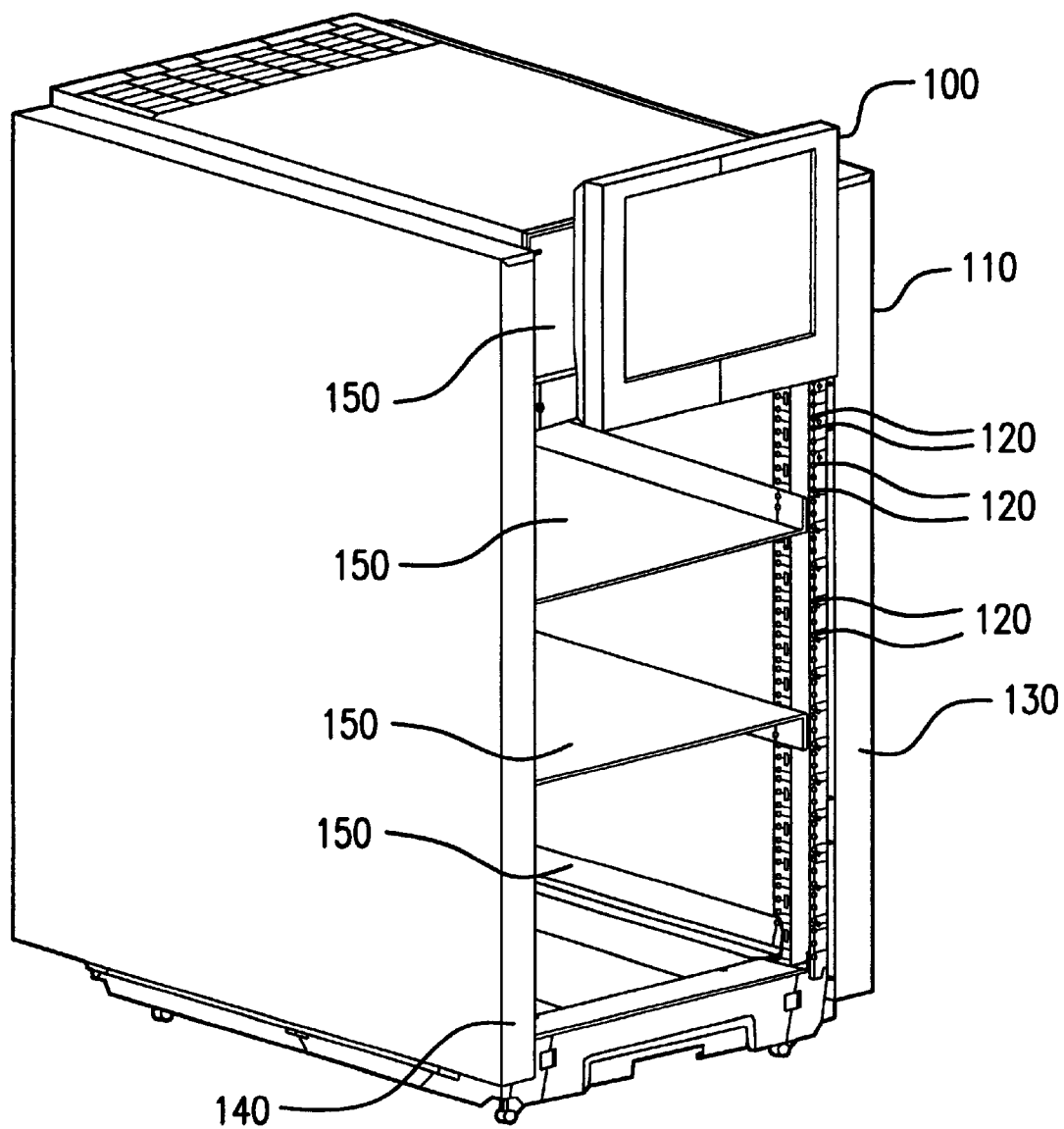
FIG. 1 is a perspective view of a flat panel display attached to a standard equipment rack with a prior art mounting system.
Figure 2:
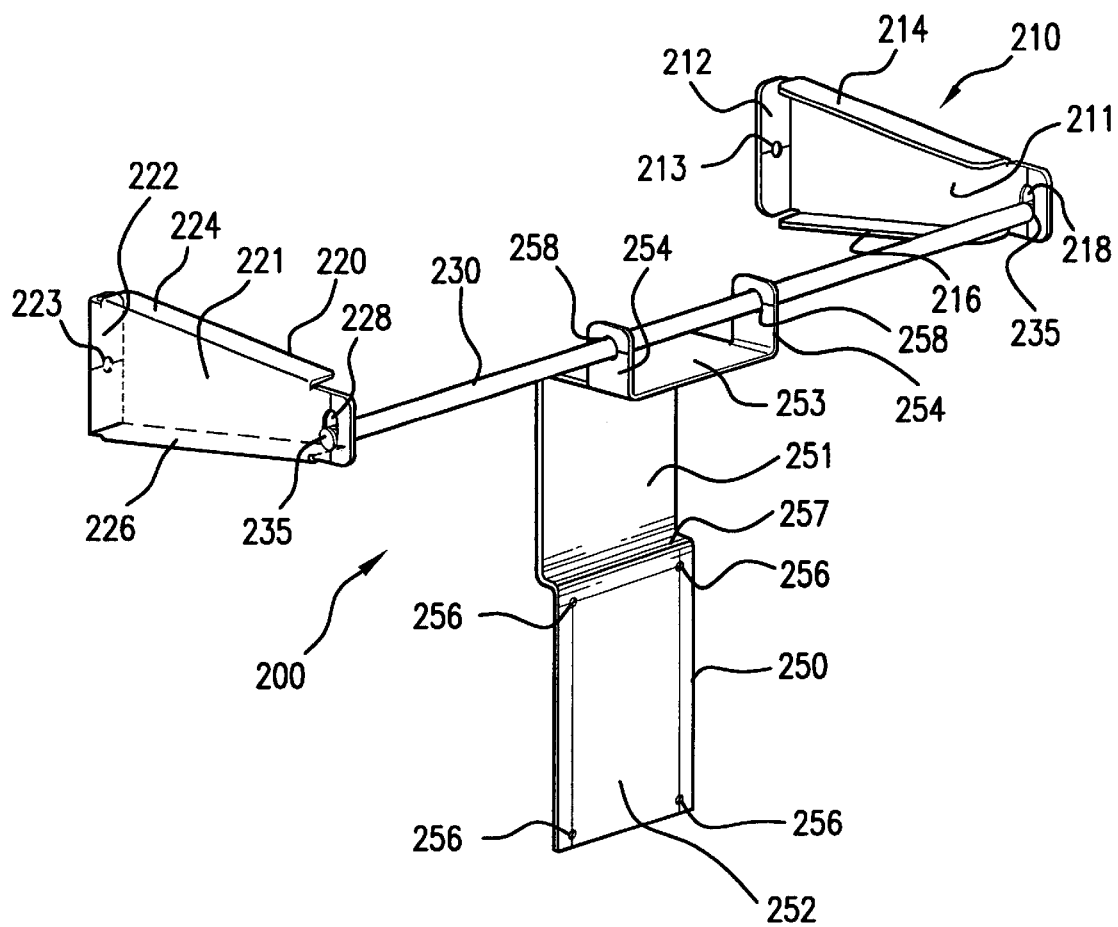
FIG. 2 is a perspective view of a flat panel display attached to a standard equipment rack with a mounting assembly in accordance with the invention.

FIG. 2 is a perspective view of a preferred embodiment of a rack mount identified generally as 200 for mounting a flat panel display, not shown, to an equipment rack. Rack mount 200 includes right support bracket 210 and left support bracket 220, a hanging rod 230 supported between support bracket 210 and support bracket 220, and a hanging bracket 250. Preferably, right support bracket 210 and left support bracket 220 are substantially identical and can be oriented to either the right or left side of the equipment rack. The support brackets 210,220 comprise main plates portions 211,221, rear plate portions 212,222, upper plate portions 214,224, lower plate portions 216,226 slotted key holes 118,228. Rear plate portions 212,222 each contain attachment holes 213,223. The main plate portions 211,221 are generally rectangular in shape and have left, right, top and bottom sides. Referring to support bracket 210, the rear plate portion 212 is attached to the left side of the main plate 211 and the slotted key hole 218 is located near the right side of the main plate 211.

In a preferred embodiment, referring to main plate portion 211, the left side is longer than the right side. The top and bottom side taper in equal amounts throughout a major portion of their lengths. In an even more preferred embodiment, the portions of the top and bottom sides adjacent to the slotted key hole 218 are parallel to each other.

In the preferred embodiment, the length of the left side is 2.5 inches. The distance from the left side to the right side is 6.25 inches. The width of the rear plate portion 212, the upper plate portion 214 and the lower plate portion is 0.8 inches. In the more preferred embodiment, the length of the taper portions of the top and bottom sides is sized according to preference and the parallel portions of the top and bottom sides adjacent to the slotted key hole is likewise sized.

The support brackets 210,220 are sized to provide clearance of the equipment and cables in the equipment rack. Accordingly, the support brackets must extend far enough from the equipment rack so as to not interfere with the equipment and cables when the flat panel display hangs vertically from the hanging rod 230. In a preferred embodiment, the length of the support brackets 210,220 from the rear plate to the opposing end is 6.25 for a 19 inch rack, as mentioned previously. Naturally, the dimensions of the support brackets 210,220 can vary. The ideal length of the brackets ultimately varies depending on the amount of clearance needed by the particular equipment rack.

Preferably, the slotted key holes 218,228 are dual slotted. Accordingly, the slotted key holes 218,228 have a larger center section and two smaller slot sections. The two smaller slot sections extend in directions opposite to each other, up and down. Depending on the orientation of support bracket 210,220, smaller slot sections will always be oriented in the downward direction.

Figure 3:
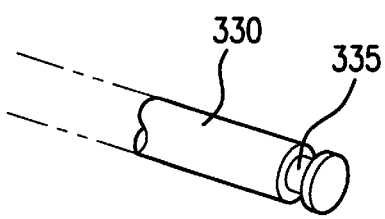
FIG. 3 is a perspective view of the assembled mounting assembly in accordance with the invention.

Referring to FIG. 3, a perspective view of one end of a hanging rod is shown. The distal ends of hanging bar 330 include grooved portions 335. Grooved portions 335 are sized to correspond to the slotted key holes 218,228 in the support brackets 210,220. Accordingly, the length of the grooved portions 335 is substantially equivalent to the width of the main plates 211,221 of the support brackets 210,220 and the diameter of the grooved portions 335 is smaller than the size of the smaller slot sections of the slotted key holes 218,228.

Referring now to FIG. 2, hanging rod 230 is held in position at each end by the support brackets 210,220. The grooved portions 235 are firmly coupled with the lower smaller slot portions of the slotted key holes 218,228. The coupling action between the grooved portions 235 and the slotted key holes 218,228 prevent sliding of the hanging rod 230.

The diameter of the hanging rod 230 is slightly smaller than the larger portion of the slotted key holes 218,228 to allow hanging rod 230 to pass through. Passing the hanging rod 230 through the slotted key holes 218,228 allows for easy assembly and retrofit in existing equipment racks in the field.

Hanging bracket 250 suspends from the hanging rod 230. Hanging bracket 250 includes a first face portion 251, a second face portion 252, an upper flat portion 253, one (not shown) or two attachment wings 254, four monitor screw holes 256 and an offset portion 257. In a preferred embodiment, the two attachment wings 254 include holes 258. The holes 257 are sized to be slightly larger than the diameter of the hanging rod 230 thus allowing the hanging rod 230 to pass therethrough. In other embodiments of the invention, the attachment wings 254 can include a slotted arrangement, not shown, that circumscribe the hanging bar 230 only partially. The slotted portions can include a plurality of notches allowing the attached and suspended flat panel display to tilt at various angles.

The offset portion 257 and the four monitor screw holes 256 are arranged to correspond to the design of all flat screen monitors. Flat screen monitors include a standard offset portion and a four screw hole arrangement intended for securing the monitor to a variety of configurations.

The hanging bracket 250 is proportioned to achieve a vertical hang from the hanging bar 230 with a flat display monitor attached. In a preferred embodiment, the distance from the front to the back of the upper flat portion 253 is sized to correspond to the dimensions of the flat panel display being mounted.

The hanging bracket 250 slides left to right until the attachment wings 254 contact the support brackets 211,221. In a preferred embodiment, sliding the hanging bracket 250 with a flat display monitor attached allows access to at least one half of the equipment and cabling in an equipment rack. Preferably, sliding the hanging bracket 250 with a flat display monitor attached allows access to 56% of the equipment and cabling in an equipment rack. In a preferred embodiment, the width of the upper flat portion 253 is four inches.

Figure 4:
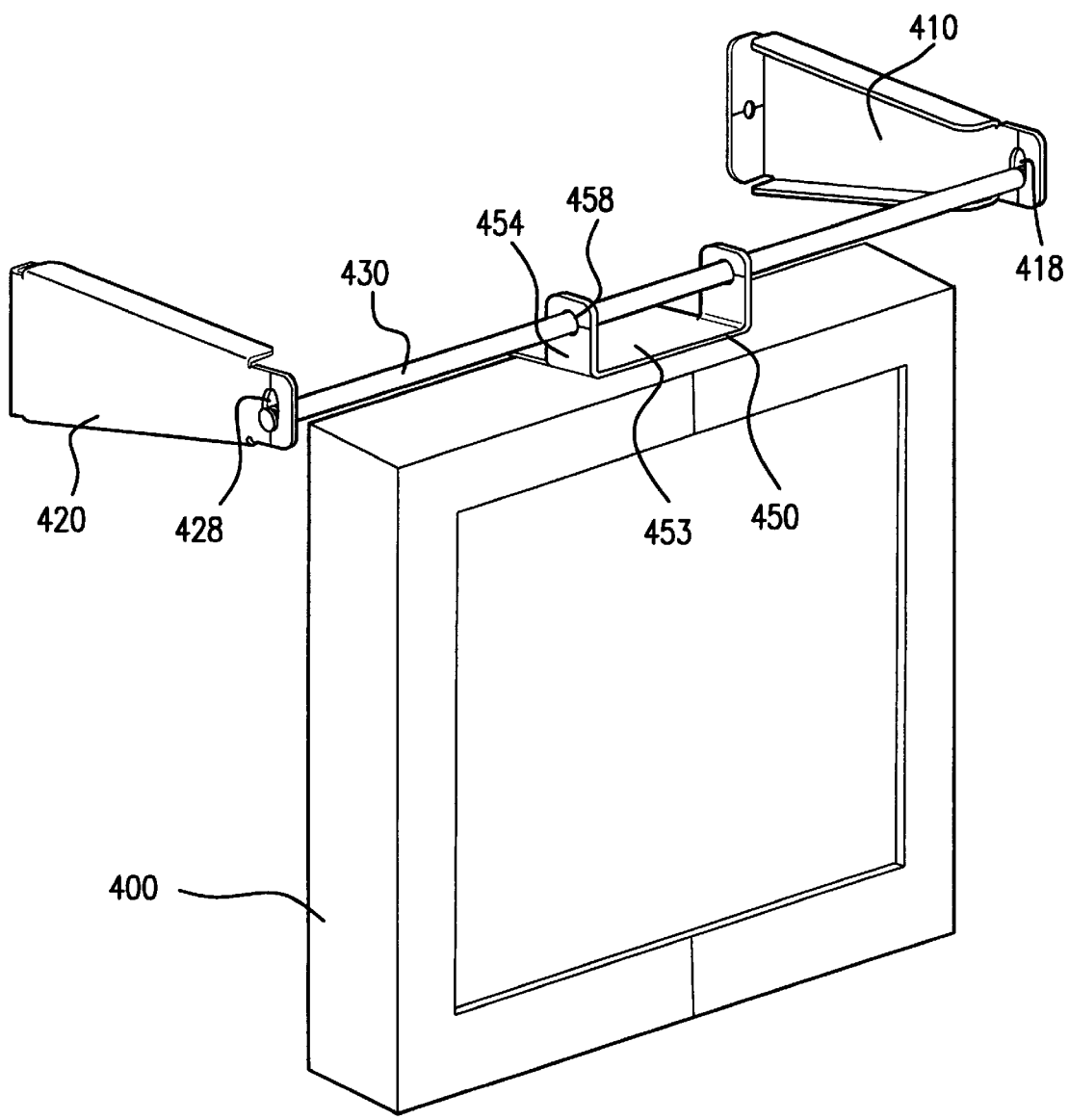
FIG. 4 is a perspective view of the assembled mounting assembly with an attached flat panel display in accordance with the invention.

Referring to FIG. 4, a perspective view of an assembled rack mount with an attached flat panel display is shown. The support brackets 410,420 are positioned opposed to each other, with one support bracket 410 on the right and the other support bracket 420 on the left. Hanging rod 430 is suspended between the support brackets 410,420. Hanging rod 430 is inserted in the slotted key holes 418,428 in the support brackets as discussed above in relation to FIG. 2. The hanging bracket 450 hangs from the hanging rod 43 by the attachment wings 454. The hanging rod 430 is inserted through the holes 458 in the attachment wings 454. Flat panel display 400 is attached to hanging bracket 450. The upper flat portion 453 of the hanging bracket 450 lies along the upper side of the flat panel display 400. The hanging bracket 450 and the flat panel display 400 slide horizontally along the axis of the hanging rod 430. The support brackets 410,420 define the limits of the extent to which the hanging bracket 450 and the flat panel display 400 can slide in either direction along the axis of the hanging rod 430. The hanging bracket 450 and the flat panel display also rotate around the axis of the hanging rod 430.

As discussed in relation to FIG. 2, in a preferred embodiment of the invention, the length of the upper flat portion 453 is such as to allow the flat panel display to hang vertically. In a further preferred embodiment of the invention, the width of the upper flat portion is such as to allow the flat panel display to slide in either direction so that at least half of the equipment and cables directly behind the flat panel display is accessible. The other half of the equipment and cables is accessible by sliding the flat panel display in the opposite direction.

Figure 5:
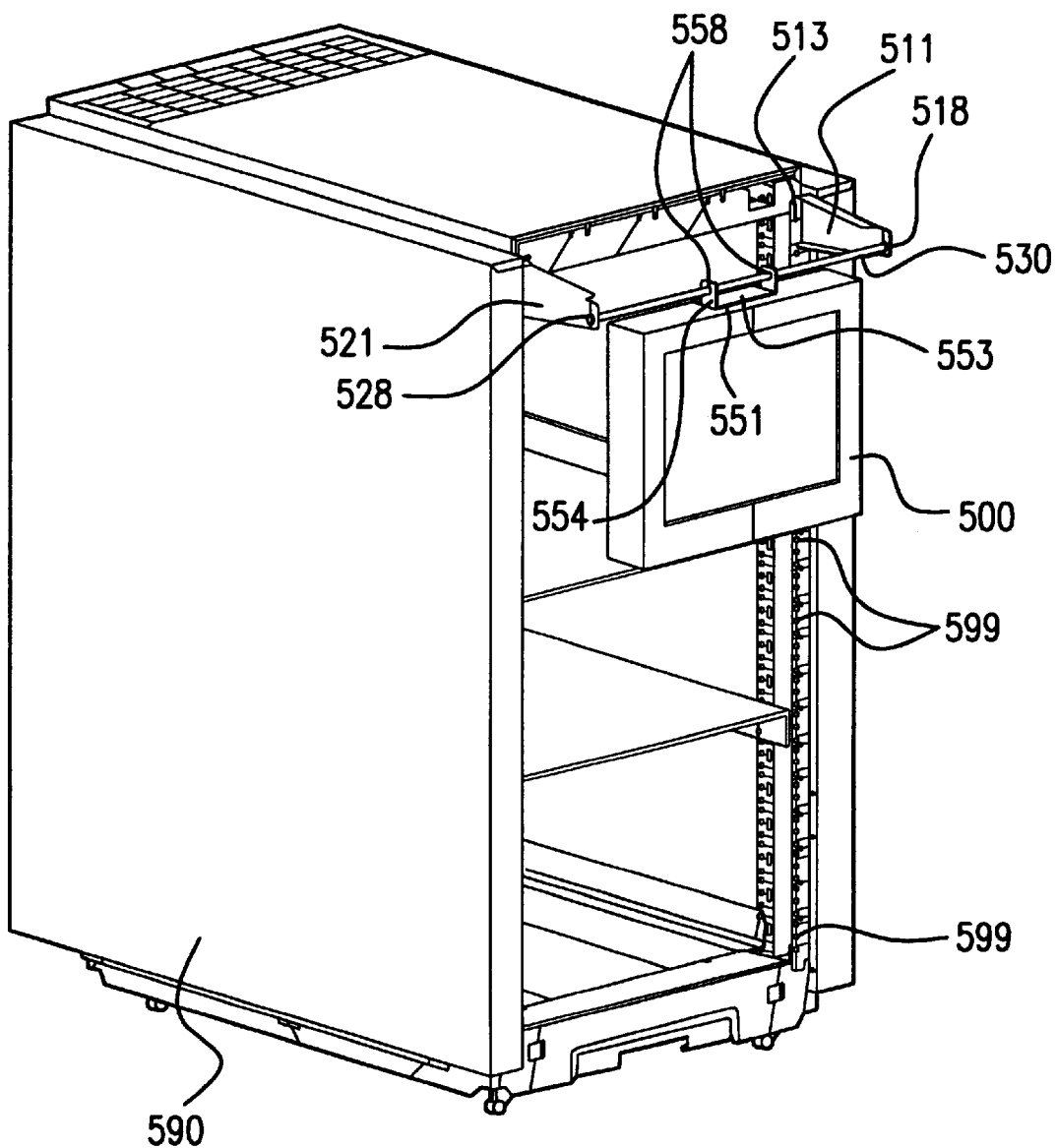
FIG. 5 is a perspective view of the back side of a flat panel display with a hanging bracket attached in accordance with the invention.

Referring now to FIG. 5, the rack mount is shown attached to an equipment rack 590 in accordance with the invention. Easy assembly and attachment of the rack mount of the invention is provided so that simple retrofitting of existing equipment racks is possible. Further, a method of attaching a rack mount in accordance with the invention is provided whereby few tools are necessary. The rack mount is easily attached to an equipment rack by first attaching one of the support brackets 511,521 to the equipment rack. For this discussion, it is assumed that the right side bracket 511 is attached first, although the left bracket 521 is just as easily attached first. The right support bracket 511 is attached to the equipment rack by matching the screw hole 513 of the support bracket with a desired screw hole 599 in the equipment rack. A dress screw (not shown), which already exists with the equipment rack is used to secure the support bracket 511 to the equipment rack. The left support bracket 521 is attached to the equipment rack in similar fashion utilizing an opposing screw hole in the equipment rack and the existing dress screw. The length of the support brackets is such that once they are attached to the equipment rack they do not interfere with any other screw holes in the equipment rack. By sizing the support brackets 511,512 to the maximum size without causing interference with any other dress screws maximizes the available torque and allows support of greater weights.

Figure 6:
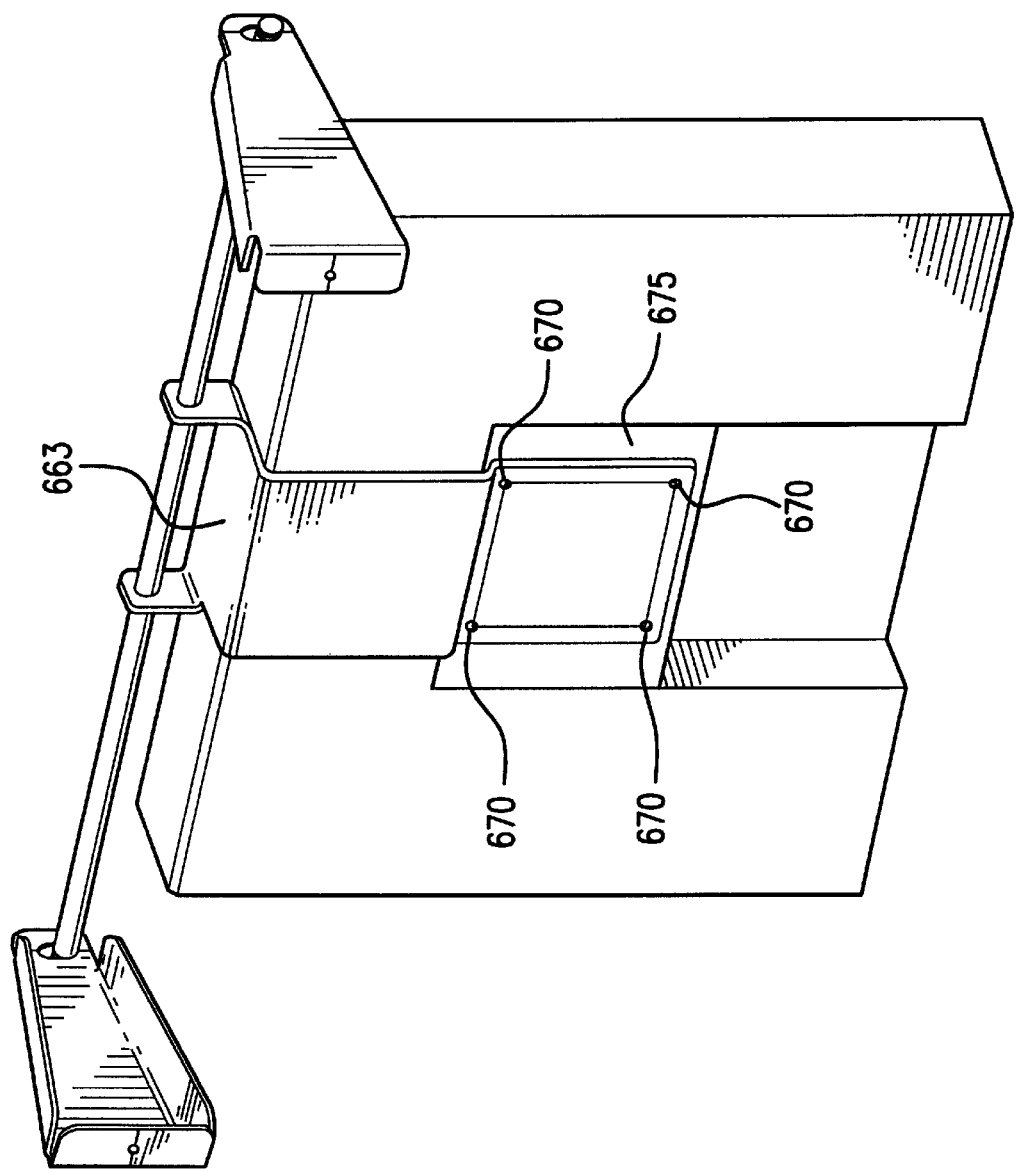
FIG. 6 is a perspective view of a hanging bracket attached to an equipment rack in accordance with the invention.

Referring briefly now to FIG. 6, the hanging bracket 653 is attached to the back of the flat panel display by addressing the hanging bracket 663 so that the four screw holes 670 squarely address the four screw holes located in the depressed portion 675 of the back of the flat panel display. The hanging bracket 663 is secured to the back of the flat panel display utilizing four screws (not shown) already existing with the flat panel display.

Referring again to FIG. 5, hanging rod 530 is inserted through one of the slotted key holes 518,528 in either of the support brackets 511,521, through the holes 558 located in the attachment wings 554 of the hanging bracket 553 and the hanging rod 530 is then passed through the other of the slotted key holes 518,528 in the opposite support bracket 511,521. After the hanging rod 530 is inserted, it drops into the smaller portion of the slotted keyhole so that the grooved portion (not shown) coincides therewith. As such, the hanging rod 530 is firmly held in place with the hanging bracket 553 and flat panel display 500 suspended therefrom.

The hanging bracket 553 and flat panel display 500 rotate around the hanging rod 530. Further, the hanging bracket 553 and flat panel display 500 slide left and right until the attachment wings 554 contact either support bracket 511, 521.

What is claimed is:

1. A flat panel display mount for an equipment rack for electronic equipment, comprising:
  a) a pair of support brackets fastenable to said equipment rack, each support bracket comprising a main plate portion, a rear plate portion, an upper plate portion and a lower plate portion, said rear plate portions being located at a first end of each of said main plate portions;
  b) a hole located in a second end of each of said main plate;
  c) a hanging rod, said rod being insertable into said holes, wherein said rod suspends from said pair of support brackets when inserted in said holes; and
  d) a hanging bracket fastenable to the back of said flat panel display, said hanging bracket comprising a back face portion, an upper flat portion and at least one attachment wing; wherein said hanging bracket slideably and rotatably suspends from said hanging rod by said at least one attachment wing; wherein each of said holes comprises a dual slotted key hole.

2. The mount of claim 1, wherein said dual slotted key holes comprise a center section of a first diameter and a first and a second slot sections of a second diameter; and said first and second slot sections are in opposing positions with respect to said center section.

3. The mount of claim 2, wherein:
  said hanging rod comprises a first and second end:
    each of said first and said second ends comprises a grooved portion; and
    said grooved portion is sized to couple with said slot portions of the slotted key holes.

4. The mount of claim 3, wherein said support brackets have a length extending from said equipment rack sufficient so that said flat panel display does not interfere with said equipment.

5. A flat panel display mount for an equipment rack for electronic equipment, comprising:
  a) a pair of support brackets fastenable to said equipment rack, each support bracket comprising a main plate portion, a rear plate portion, an upper plate portion and a lower plate portion, said rear plate portions being located at a first end of each of said main plate portions;
  b) a hole located in a second end of each of said main plate;
  c) a hanging rod, said rod being insertable into said holes, wherein said rod suspends from said pair of support brackets when inserted in said holes; and
  d) a hanging bracket fastenable to the back of said flat panel display, said hanging bracket comprising a back face portion, an upper flat portion and at least one attachment wing; wherein said hanging bracket slideably and rotatably suspends from said hanging rod by said at least one attachment wing;
  wherein said hanging bracket comprises a pair of said attachment wings, each of said wings comprising a hole, said hole being sized to accommodate said hanging rod.

6. The mount of claim 5, wherein said hanging bracket is slideable along the full extent of said hanging bar.

7. The mount of claim 6, wherein said attachment wings are separated from each other by a distance which allows said hanging bracket to slide an amount in either direction so that a least one-half of said equipment rack is accessible.

8. A method of mounting an equipment rack support for a flat panel display comprising the steps of:
  a) securing a first support bracket to said equipment rack, said first support bracket comprising main plate portion, a rear plate located at a first end of said first support bracket and a first hole located in a second end of each of said first support bracket.
  b) securing a second support bracket to said equipment rack, said second support bracket having a main plate portion, a rear plate located at a first end of said second support bracket and a second hole located in a second end of each of said support bracket;
  c) inserting a hanging rod through said hole in said first support bracket and said hole in said second bracket, wherein said hanging rod is sized to span from said first support bracket to said second bracket; and d) slideability suspending a hanging bracket with a suspension means from said hanging rod.

9. The method of claim 8, wherein;

said first and said second support brackets are secured to said equipment rack utilizing one of a plurality of dress screw holes located in said equipment rack.

10. The method of claim 9, wherein said first support bracket and said second support bracket are attached to said equipment rack in opposition to one another and wherein said first support bracket is identical to said second support bracket.

11. The method of claim 10, further comprising the step of attaching said hanging bracket to said flat panel.

12. The method of claim 11, wherein said hanging bracket is attached to said flat panel display utilizing a plurality of screw holes located in said flat panel display.

* * * * *